(12) United States Patent
Dutart et al.

(10) Patent No.: US 6,516,783 B2
(45) Date of Patent: Feb. 11, 2003

(54) CAMSHAFT APPARATUS AND METHOD FOR COMPENSATING FOR INHERENT INJECTOR DELAY IN A MULTIPLE FUEL INJECTION EVENT

(75) Inventors: Charles H. Dutart, Washington, IL (US); Eric C. Fluga, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/855,651

(22) Filed: May 15, 2001

(65) Prior Publication Data

US 2002/0170532 A1 Nov. 21, 2002

(51) Int. Cl.[7] .......................... F02M 47/02; B05B 1/30
(52) U.S. Cl. ........................ 123/446; 123/478; 239/88
(58) Field of Search ................................ 123/299, 300, 123/446, 478, 480, 490; 239/88

(56) References Cited

U.S. PATENT DOCUMENTS

| | | |
|---|---|---|
| 4,571,683 A | 2/1986 | Kobayashi et al. |
| 4,576,135 A | 3/1986 | Johnson |
| 4,621,599 A | 11/1986 | Igashira et al. |
| 4,704,999 A | 11/1987 | Hashikawa et al. |
| 4,729,056 A | 3/1988 | Edwards et al. |
| 4,836,161 A | 6/1989 | Abthoff et al. |
| 4,922,878 A | 5/1990 | Shinogle et al. |
| 5,020,979 A | 6/1991 | Askew |
| 5,070,836 A | 12/1991 | Wahl et al. |
| 5,113,833 A | 5/1992 | Nagano et al. |
| 5,245,972 A | 9/1993 | Denz et al. |
| 5,267,545 A | 12/1993 | Kitson |
| 5,268,842 A | 12/1993 | Marston et al. |
| 5,277,164 A | 1/1994 | Takahashi et al. |
| 5,320,079 A | 6/1994 | Kuwabara |
| 5,379,733 A | 1/1995 | Haddick et al. |
| 5,427,072 A | 6/1995 | Udo |
| 5,427,083 A | 6/1995 | Ahern |
| 5,450,829 A | 9/1995 | Beck |
| 5,460,128 A | 10/1995 | Kruse |
| 5,478,045 A | * 12/1995 | Ausman et al. ............... 251/54 |

(List continued on next page.)

FOREIGN PATENT DOCUMENTS

EP 0 221 832 A2 5/1987

OTHER PUBLICATIONS

SAE Technical Paper Series 97–891 "A New Concept for Low Emission Diesel Combustion" Feb. 24–27, 1997.
SAE Technical Papers Series 97–891 "A New Concept for Low Emission Diesel Combustion" Feb. 24–27, 1997.

*Primary Examiner*—Tony M. Argenbright
(74) *Attorney, Agent, or Firm*—Blackwell Sanders Peper Martin (57) ABSTRACT

An apparatus and method for causing a fuel injector to overcome its inherent fuel injection pressure threshold long enough to completely inject a predetermined volume of fuel during each fuel shot associated with a particular fuel injection event. The fuel injector is in electrical communication with an electronic controller for receiving control signals of pre-calculated timing and duration therefrom. Furthermore, the fuel injector is in mechanical communication with a cam follower. A camshaft has a cam profile in mechanical communication with the cam follower, the cam profile including at least one lobe operable to generate pressure within the fuel injector sufficient to overcome the fuel injection pressure threshold in predetermined intervals in conjunction with the control signal of the electronic controller.

21 Claims, 5 Drawing Sheets

U.S. PATENT DOCUMENTS

| | | | |
|---|---|---|---|
| 5,492,098 A | | 2/1996 | Hafner et al. |
| 5,499,608 A | | 3/1996 | Meister et al. |
| 5,507,260 A | | 4/1996 | Hintzen |
| 5,540,205 A | | 7/1996 | Davis et al. |
| 5,549,092 A | | 8/1996 | Hasegawa et al. |
| 5,564,391 A | * | 10/1996 | Barnes et al. ............... 123/446 |
| 5,566,650 A | | 10/1996 | Kruse |
| 5,566,660 A | | 10/1996 | Camplin et al. |
| 5,588,415 A | | 12/1996 | Ahern |
| 5,609,131 A | | 3/1997 | Gray, Jr. et al. |
| 5,611,317 A | * | 3/1997 | Peters et al. ............ 123/446 X |
| 5,634,448 A | | 6/1997 | Shinogle et al. |
| 5,647,317 A | | 7/1997 | Weisman, II et al. |
| 5,671,716 A | * | 9/1997 | Hetrick et al. .............. 123/491 |
| 5,678,521 A | | 10/1997 | Thompson et al. |
| 5,685,273 A | | 11/1997 | Johnson et al. |
| 5,701,870 A | | 12/1997 | Gottshall et al. |
| 5,704,336 A | | 1/1998 | Wrobel |
| 5,722,373 A | | 3/1998 | Paul et al. |
| 5,732,676 A | * | 3/1998 | Weisman et al. ........... 123/436 |
| 5,732,680 A | | 3/1998 | Ninomiya et al. |
| 5,740,775 A | | 4/1998 | Suzuki et al. |
| 5,740,776 A | | 4/1998 | Enderle et al. |
| 5,746,183 A | | 5/1998 | Parke et al. |
| 5,778,850 A | | 7/1998 | Buratti et al. |
| 5,794,585 A | | 8/1998 | Yonezawa et al. |
| 5,803,049 A | | 9/1998 | Harcombe |
| 5,832,901 A | | 11/1998 | Yoshida et al. |
| 5,839,275 A | | 11/1998 | Hirota et al. |
| 5,839,420 A | * | 11/1998 | Thomas ...................... 123/478 |
| 5,865,153 A | | 2/1999 | Matsumoto |
| 5,865,158 A | | 2/1999 | Cleveland et al. |
| 5,893,347 A | | 4/1999 | McGee et al. |
| 5,924,403 A | * | 7/1999 | Thomas ...................... 123/300 |
| 5,979,398 A | | 11/1999 | Yanagihara et al. |
| 5,979,412 A | | 11/1999 | Werner |
| 5,986,871 A | * | 11/1999 | Forck et al. ................. 361/160 |
| 6,000,381 A | | 12/1999 | Brown et al. |
| 6,006,727 A | | 12/1999 | Katashiba et al. |
| 6,009,849 A | | 1/2000 | Yamamoto et al. |
| 6,014,956 A | | 1/2000 | Cowden et al. |
| 6,021,370 A | | 2/2000 | Bellinger et al. |
| 6,026,780 A | | 2/2000 | Barnes et al. |
| 6,032,642 A | | 3/2000 | Trumbower et al. |
| 6,044,824 A | | 4/2000 | Mamiya et al. |
| 6,055,957 A | * | 5/2000 | Hasegawa et al. .......... 123/305 |

\* cited by examiner

CAMSHAFT APPARATUS AND METHOD FOR COMPENSATING FOR INHERENT INJECTOR DELAY IN A MULTIPLE FUEL INJECTION EVENT

TECHNICAL FIELD

This invention relates generally to electronically controlled fuel injection systems and, more particularly, to an apparatus for adjusting the duration of each fuel shot associated with a multi-shot fuel injection to compensate for the inherent delay between electrical activation of the fuel injector and the actual start of fuel injection.

BACKGROUND

Electronically controlled fuel injectors are well known in the art including mechanically actuated electronically controlled fuel injectors. Electronically controlled fuel injectors typically inject fuel into a specific engine cylinder as a function of an injection signal received from an electronic controller. These signals include waveforms that are indicative of the desired timing and quantity of fuel to be injected into the cylinders. As used throughout this disclosure, an injection event is defined as the injections that occur in a cylinder during one cycle of the engine. For example, one cycle of a four cycle engine for a particular cylinder, includes an intake, compression, expansion, and exhaust stroke. Therefore, the injection event in a four stroke engine includes the number of injections, or shots, that occur in a cylinder during the four strokes of the piston. The term shot as used in the art may also refer to the actual fuel injection or to the command current signal to a fuel injector or other fuel actuation device indicative of an injection or delivery of fuel to the engine. Each injection waveform may include a plurality of distinct and/or rate-shaped fuel shots delivered to a cylinder during a particular fuel injection event.

Techniques utilizing multiple fuel injection during an injection event may be utilized to modify the burn characteristics of the combustion process in an attempt to reduce emission and noise levels. Multiple fuel injection involves splitting the total fuel delivery to the cylinder during a particular injection event into a number of separate fuel injection shots, such as into two fuel shots generally referred to as a main injection, and an anchor injection.

Due to the construction and operation of mechanically actuated electronically controlled fuel injectors, there is an inherent dead band or delay associated with the commencement of a given injection current pulse and the actual start of fuel injection during the pulse duration. This delay is known in the art as the SOC/SOI delay, that is, the delay from the start of current (SOC) to the start of the injection (SOI).

In prior art mechanically actuated injection systems, the SOC/SOI delay is ignored when calculating the duration of the current pulse necessary to deliver the volume of fuel requested by the governor for the associated fuel shot. Consequently, less than the requested volume of fuel is injected into the cylinder for the given fuel shot. If only one shot is delivered during an injection event, the governor may correct its fuel request to account for the SOC/SOI delay. But when multiple shots are delivered during an injection event, the governor must adjust to additional SOC/SOI offsets for each shot, making it difficult to maintain a steady state engine speed and desired emission level.

It is, therefore, desirable to improve the performance of mechanically actuated electronically controlled fuel injectors by adjusting the duration and/or the rate of fuel delivery for each fuel shot so that the desired volume of fuel for each shot is injected. It is also desirable to adjust the current duration of one or more fuel shot associated with a particular multi-shot fuel injection event in order to compensate for the SOC/SOI delay and to deliver the appropriate and desired amount of fuel during each such fuel shot.

Accordingly, the present invention is directed to overcoming one or more of the problems as set forth above.

SUMMARY OF THE INVENTION

In one aspect of the present invention there is disclosed a fuel injection control system for regulating the injection duration of a fuel shot associated with a multi shot injection event of a fuel injector, the fuel injector having an inherent fuel injection pressure threshold and being in mechanical communication with a cam follower. The system comprises an electronic controller in electrical communication with the fuel injector, the controller being configured to deliver a electronic control signal thereto, and a camshaft having a cam profile in mechanical communication with the cam follower. The cam profile is operable to generate pressure within the fuel injector sufficient to overcome the fuel injection pressure threshold in predetermined intervals in conjunction with the control signal of the electronic controller.

BRIEF DESCRIPTION OF THE DRAWINGS

For a better understanding of the present invention, reference may be made to the accompanying drawings in which.

DETAILED DESCRIPTION

Figure 1:
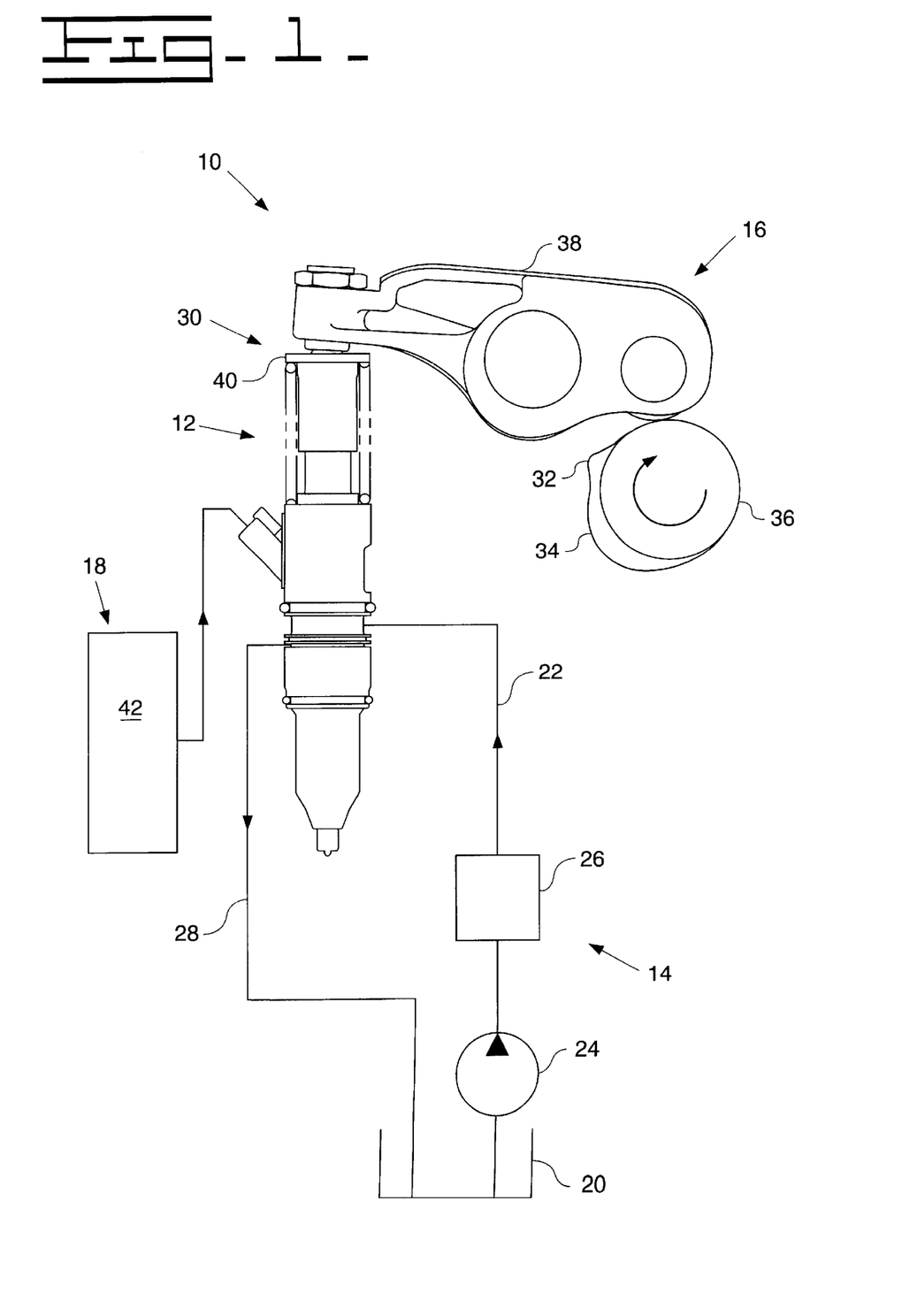
FIG. 1 is an elevational view of a mechanically activated fuel injector controlled by the present invention together with a cam shaft and rocker arm and further illustrating a block diagram of a transfer pump and a drive circuit for controlling the fuel injector.

Referring to FIG. 1, a portion of a mechanically actuated electronically controlled fuel injection system 10 is shown in an exemplary configuration as adapted for a compression ignition engine. However, it should be understood that the present invention is also applicable to other types of engines, such as rotary engines, modified-cycle engines, in-line engines, or V-type engines, and that the engine may contain one or more engine combustion chambers or cylinders.

The fuel system 10 has at least one cylinder head wherein each cylinder head defines one or more separate injector bores, each of which receives an injector 12. The fuel system 10 further includes fuel supply apparatus or means 14 for supplying fuel to each injector 12, fuel pressurizing apparatus or means 16 for causing each injector 12 to pressurize fuel, and a controller apparatus or means 18 for electronically controlling the fuel injection system including the manner and frequency in which fuel is injected by the injectors 12 including timing, number of injections per injection event, fuel quantity per injection, time delay between each injection, and the injection profile.

The fuel supplying apparatus 14 preferably includes a fuel tank 20, a fuel supply passage 22 arranged in fluid communication between the fuel tank 20 and the injector 12, a relatively low pressure fuel transfer sump or reservoir 24, one or more fuel filters 26 and a fuel drain passage 28 arranged in fluid communication between the injector 12 and the fuel tank 20. If desired, fuel passages may be disposed in the head of the engine in fluid communication with the fuel injector 12 and one or both of the passages 22 and 28.

The fuel pressurizing apparatus 16 may be any mechanically actuating device. In the embodiment shown, a tappet and plunger assembly 30 associated with the injector 12 is mechanically actuated indirectly or directly by first and second cam lobes 32 and 34 of an engine-driven camshaft 36. The cam lobes 32 and 34 drive a pivoting rocker arm assembly 38 which, in turn, reciprocates a plunger 40 associated with the tappet and plunger assembly 30. Alternatively, a push rod (not shown) may be positioned between the camshaft 36 and the rocker arm assembly 38.

In an alternative embodiment, a single-lobe cam (not shown) may be used to deliver all three shots during a single velocity increase of the lobe. In yet another embodiment, a camshaft having at least three separate lobes (not shown) may be used to deliver the desired number of shots. It should be noted that, in some embodiments, it may be desirable to design the cam lobe(s) to actuate injections having different pressure capabilities resulting in varying fuel flow rates for each shot, thereby yielding different physical quantities of fuel for each shot during the same actuation current pulse duration 56.

The electronic control apparatus 18 preferably includes an electronic control module (ECM), or electronic controller 42, the use of which is well known in the art. The ECM 42 typically includes processing capability such as a microcontroller or microprocessor, a governor such as a proportional integral derivative (PID) controller for regulating engine speed, and circuitry including input/output circuitry, solenoid driver circuitry, analog circuits and/or programmed logic arrays as well as associated memory. The memory is connected to the microcontroller or microprocessor and stores instruction sets, maps, lookup tables variables, and more.

The ECM 42 may be used to control many aspects of fuel injection including: (1) fuel injection timing, (2) total fuel injection quantity during an injection event, (3) fuel injection pressure, (4) the number of separate injections or fuel shots during each injection event, (5) the time interval(s) between the injections or fuel shots, (6) the time duration of each injection or fuel shot, (7) the fuel quantity associated with each injection or fuel shot, (8) the current level of the injector waveform, and (9) any combination of the above parameters. Each of such parameters is variably controllable independent of engine speed and load. Furthermore, the ECM 42 receives a plurality of sensor input signals which correspond to known sensor inputs such as engine operating conditions including engine speed, throttle position, engine temperature, pressure of the actuation fluid, cylinder piston position and so forth that are used to determine the desired combination of injection parameters for a subsequent injection event.

During its compression stage, the reciprocating plunger 40 displaces any fuel in the injector 12 either through an injection port controlled by a check valve (not shown) during an injection event, or through a spill port controlled by the poppet valve during a non-injection event. The check valve is in a normally closed state, and opens when the fuel pressure within the injector 12 is sufficient to drive the check valve open. Movement of the plunger 40 in conjunction with the open/close state of the poppet valve determines the pressure of the fuel within the injector 12. The open/closed state of the poppet valve is determined by a current driven solenoid (not shown) or other actuating device controlled by the ECM 42. Therefore, during sufficient compression, the plunger 40 will impart enough pressure to the fuel in the injector 12 to overcome the closed state of the check valve and, thereby, inject fuel to the associated cylinder unless the ECM 42 directs the solenoid to switch the poppet valve to its open state, in which case the fuel passes, instead, through the spill port.

Preferably, each injector 12 is a unit injector which includes, in a single housing, apparatus for both pressurizing fuel to a high level (for example, 207 Mpa (30,00 psi)) and injecting the pressurized fuel into an associated cylinder. Although shown as a unitized injector 12, the injector 12 could alternatively be of a modular construction wherein the fuel injection apparatus is separate from the fuel pressurization apparatus.

It is recognized that the type of fuel injection desired during any particular fuel injection event will typically vary depending upon various engine operating conditions. In an effort to achieve desired emissions, it has been found that delivering multiple fuel injections to a particular cylinder during a fuel injection event at certain engine operating conditions achieves both desired engine operation as well as emissions control.

Figure 2:
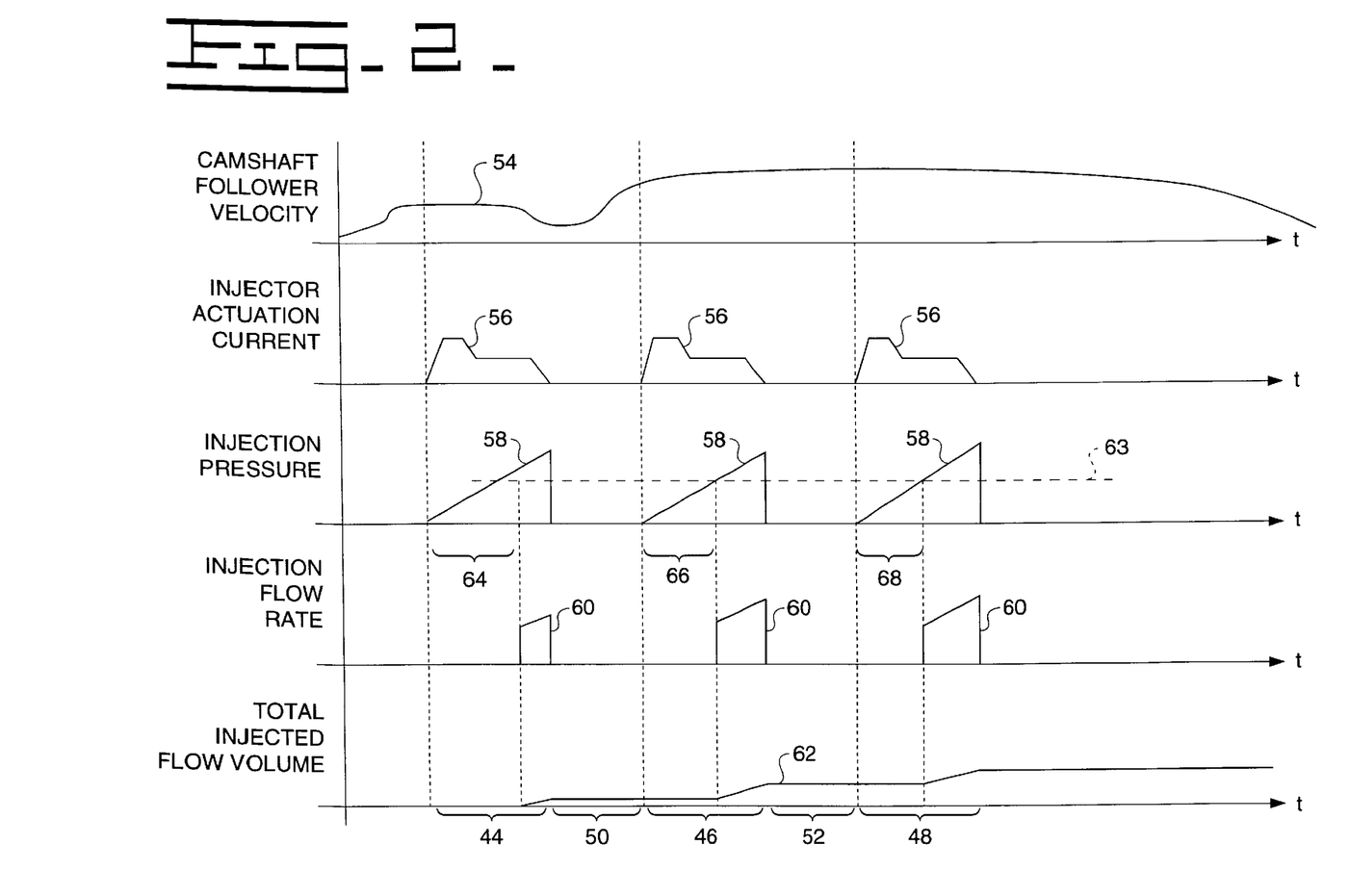
FIG. 2 is a graph of multiple wave traces illustrating, for one complete fuel injection event under given engine operating conditions, a summary of injection events for a fuel injector uncorrected by the present invention.

FIG. 2 shows one embodiment of a wave patterns illustrating events corresponding to three separate fuel injections, namely, a first fuel injection or pilot shot 44, a second fuel injection or main shot 46, and a third fuel injection or anchor shot 48, delivered during one multi-shot fuel injection event, and unregulated by the present invention. As illustrated in FIG. 2, the pilot shot 44 is injected into the combustion chamber in advance of the main shot 46 by some time factor corresponding to the main delay 50 resulting from a predetermined crank angle displacement from top dead center. Likewise, the anchor shot 48 is sequenced after the main shot 46 based upon a predetermined time factor equating to the anchor delay 52. Based upon programming associated with the electronic controller module 42, as well as a variety of different maps and/or lookup tables stored within the memory of the ECM 42, including maps and/or tables relating to engine speed, engine load, the pressure associated with the plunger 40 speed and point of travel in conjunction with the state of the poppet valve, desired total fuel quantity and other parameters, the ECM 42 is able to determine the appropriate quantity of fuel desired for each injection shot 44, 46 and 48 and partition the same accordingly. Furthermore, the ECM 42 is able to determine the desired timing and duration of each individual shot and the anchor delay 52, as well as the associated desired angular displacement for the shots.

A first wave trace 54 illustrates the displacement of the camshaft follower 38 (FIG. 1) as it follows the profiles of cam lobes 32 and 34 of the rotating camshaft 36 during one fuel injection event. Vertical displacement of the first wave trace 54 correlates to the extent to which the reciprocating plunger 40 is displaced. The slope at a given point of the first wave trace 54 correlates to the rate which the reciprocating plunger 40 is traveling at that point of displacement.

A second wave trace 56 illustrates an injector actuation current delivered from the ECM 42 to the solenoid or other actuating device to control the open/close state of the poppet valve. The duration of vertical displacement of the injector actuation current waveform, i.e., the length of the pulse, corresponds to periods when the solenoid is directing the poppet valve to close, making it possible for the pressure to build within the injector to a level sufficient to overcome the closed state of the check valve and inject fuel into the cylinder.

A third wave trace 58 illustrates the pressure within the injector 12, and is a function of the rate of plunger compression in conjunction with the extent of plunger compression, as determined by the camshaft profile when the poppet valve is closed. Vertical displacement of the pressure curve 58 is proportional to the pressure at the check valve of the injector 12.

A forth wave trace 60 illustrates the flow rate of fuel actually delivered during each injection event. Vertical displacement of the injection rate curve 60 is proportional to the rate at which fuel is injected into the cylinder by the injector 12.

A fifth wave trace 62 illustrates the cumulative volume of fuel delivered from the injector 12 to the associated cylinder at any point during an injection event. Vertical displacement of the fuel curve 62 is proportional to the total volume of fuel delivered.

In the embodiment of the present invention illustrated in FIG. 1, the cam lobe 32 provides for the pilot injection 44, and has a profile height large enough to provide for a short injection without causing the plunger 40 to exceed its stroke limit. Because the main and anchor injections 46 and 48 are tied close together, the profile of cam lobe 34 is sufficient to deliver both of these injections. The split or anchor delay 52 between the main and anchor injections 46 and 48 is provided when the ECM 42 directs the poppet valve to open momentarily just after the main injection 46 is delivered, thereby momentarily releasing the injector fuel pressure to the check valve. This allows the check valve to close until the ECM 42 directs the poppet valve to close again to build up fuel pressure to the point of forcing the check valve back open to deliver the anchor shot 48.

In practice, when the solenoid directs the poppet valve to switch to a closed state during the periods when the ECM 42 determines that it is time to generate the fuel pressure necessary to deliver the pilot, main and/or anchor shots 44, 46 and 48, an inherent delay occurs due to the time necessary to reach the check valve threshold pressure 63, i.e., to produce sufficient pressure to force the check valve open. This injection delay, known as the SOC/SOI delay, (the delay from the start of current to the start of injection), may result in a pilot offset or trim 64, a main offset or trim 66, and an anchor offset or trim 68. That is, for example, the pilot offset 64 is indicative of the injection delay associated with the pilot injection. Therefore, the injection delay associated with the pilot injection may be determined by determining the pilot offset.

To account for the SOC/SOI delay, i.e., the inherent delay in overcoming the check valve threshold pressure 63, the camshaft profile of the present invention is designed so that the height and slope of each lobe will cause the plunger 40 to be displaced a predetermined distance at a predetermined rate. This displacement of the plunger 40, in conjunction with a corresponding electrical control signal of adequate duration from the ECM 42, provides sufficient pressure for a sufficient length of time to yield injection of the desired volume of fuel for the respective fuel shot.

Figure 3:
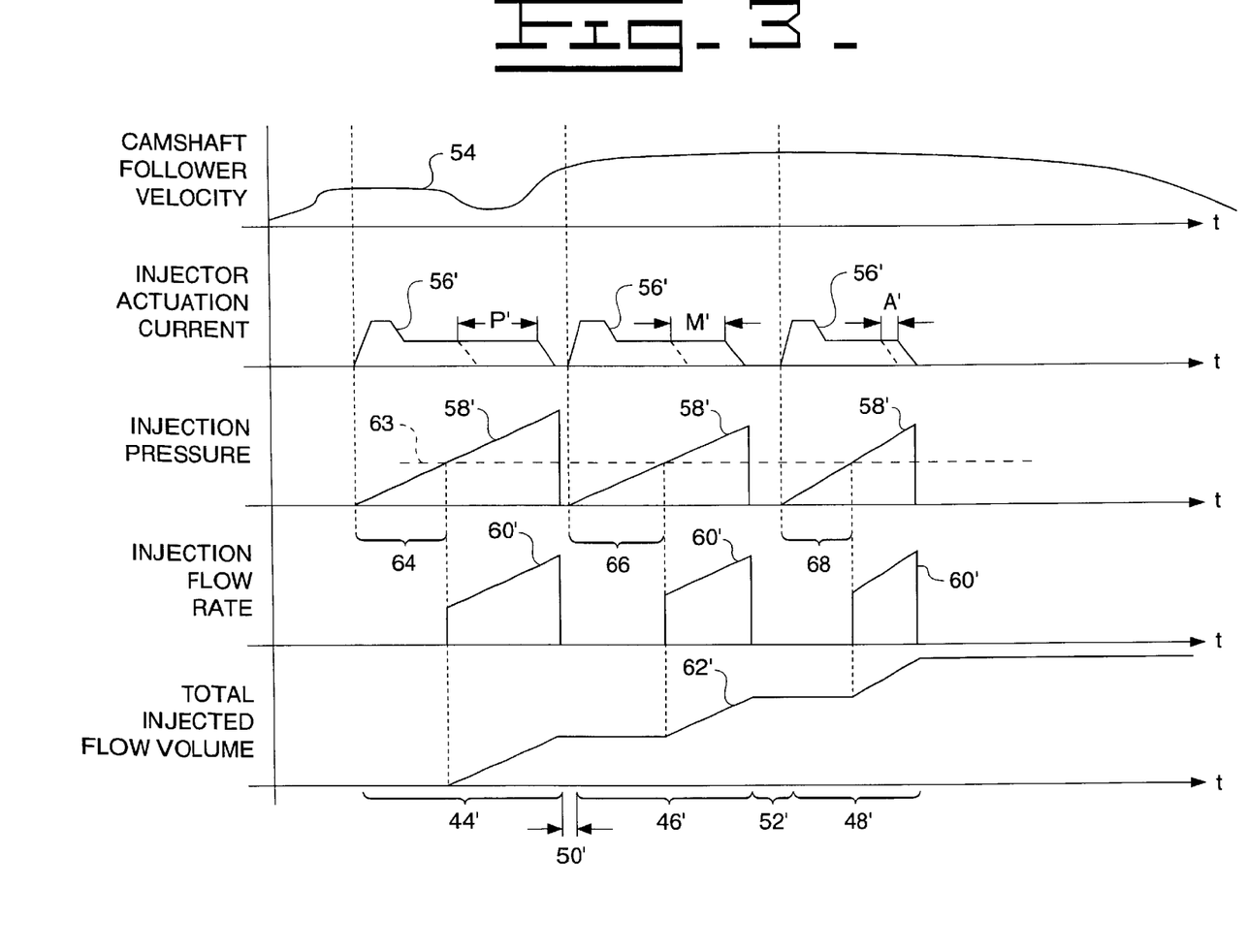
FIG. 3 is a graph of multiple wave traces illustrating, for one complete fuel injection event under given engine operating conditions, a summary of injection events for a fuel injector corrected by the present invention.

Wave traces illustrating the injection events produced when the ECM 42 corrects the injector actuation current 56 by extending the duration of each pulse for a predetermined length of time in accordance with the teachings of the present invention to produce a corrected injector actuation current 56' are shown in FIG. 3. The duration of the portion of the corrected injector actuation current waveform 56' producing the corrected pilot shot 44' is extended over the uncorrected injector actuation current 56 for a predetermined period of P'. The duration of the portion of the corrected injector actuation current waveform 56' producing the corrected main shot 46' is extended over the uncorrected injector actuation current 56 for a predetermined period of M'. The duration of the portion of the corrected injector actuation current waveform 56' producing the corrected anchor shot 48' is extended over the uncorrected injector actuation current 56 for a predetermined period of A'. The resultant duration of the corrected main and anchor delays 50' and 52' is reduced.

The extended duration of each pulse of the corrected injector actuation current 56' correlates to the solenoid energizing the poppet valve to remain in a closed state longer, thereby extending the period that the injector 12 pressure remains above the check valve threshold pressure 63. This is illustrated by the fact that the duration of each pulse of the wave trace for the corrected injector pressure curve 58' is greater than for the uncorrected injector pressure curve 58.

A corrected fuel injection flow rate curve 60' (FIG. 3) reflects the effects of the extended duration of the corrected injector actuation current, yielding pulses of greater duration than for the uncorrected fuel injection flow rate curve 60 (FIG. 2). Accordingly, the corrected injected fuel volume curve 62' (FIG. 3) shows an increase in the volume of fuel injected. Without the benefit of the camshaft lobe profile of the present invention, desired amounts of pressure will not be developed within the injector 42 at the desired intervals necessary to enable the ECM 42 to establish the proper pulse widths needed to deliver the entire volume of fuel desired for each fuel shot of an injection event.

Fuel delivery for mechanically actuated electronically controlled fuel injectors is indirectly specified in terms of "millimeters of rack", which refers to pre-electronic injection systems that used a rack and pinion flow control mechanism. In an effort to provide continuity of understanding during the transition to such electronically controlled injectors, the "rack" nomenclature has been retained, though it has to be converted to "microseconds of actuation current duration" for the injection event. A given rack is calculated by multiplying the duration of a given injection event by the engine speed, and dividing the product by a corresponding gain factor. That is to say, rack =(duration)(engine speed)/(gain factor).

The pilot rack is, therefore, equal to the duration of the pilot shot 44 multiplied by the engine speed and divided by the corresponding gain factor. The gain factor is determined by the slope of the corresponding wave trace pulse of the injector pressure curve 58, which is a function of the portion of the cam profile generating that particular shot event. Likewise, the respective rack for main and anchor shots 46 and 48 is determined by multiplying the respective duration of the main and anchor shots 46 and 48 by the engine speed and dividing by the respective gain factor of the main and anchor shots 46 and 48.

Similarly, the pilot offset or trim or deviation rack can be computed by multiplying the pilot offset, or established injection delay or trim duration by the engine speed, and dividing the product by the pilot gain factor. The main and anchor trim rack can be calculated in like fashion using respective offset duration and gain factor values.

Manipulating the above equation, it is understood that a given duration can be found by dividing the product of a corresponding rack and gain factor by the engine speed, i.e., duration=(rack)(gain factor)/(engine speed). Using this equation, it is possible to calculate the duration that the ECM 42 should activate the solenoid to maintain the injector actuation current to assure that the injector 12 injects the desired volume of fuel to the cylinder associated therewith within a given shot duration as follows:

corrected pilot injector current duration=(pilot rack+pilot offset rack)(pilot gain factor)/engine speed;

corrected main injector current duration=(main rack+main offset rack)(main gain factor)/engine speed; and corrected anchor injector current duration=(anchor rack+anchor offset rack)(anchor gain factor)/engine speed.

Once the duration, offset duration and gain factor are determined for a given pilot, main or anchor shot 44, 46 and 48, the software enables the ECM 42 to calculate the extended duration P', M' and A' of each injector actuation current pulse necessary to inject the desired amount of fuel to the cylinder during each corrected pilot, main and anchor shot 44', 46' and 48'.

Figure 4A:
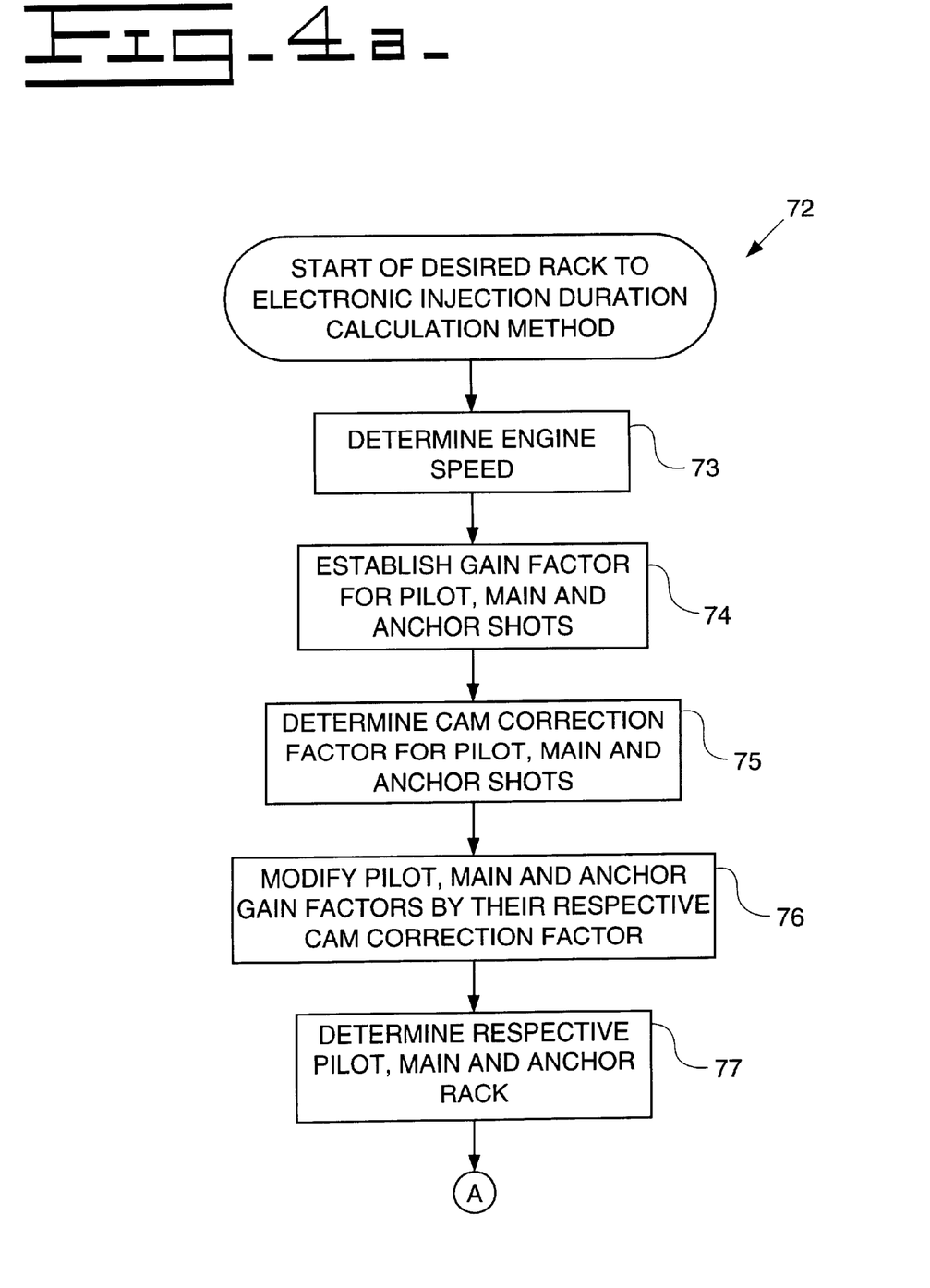
FIG. 4a is a first segment of a logic diagram showing the operation of the present invention.
Figure 4B:
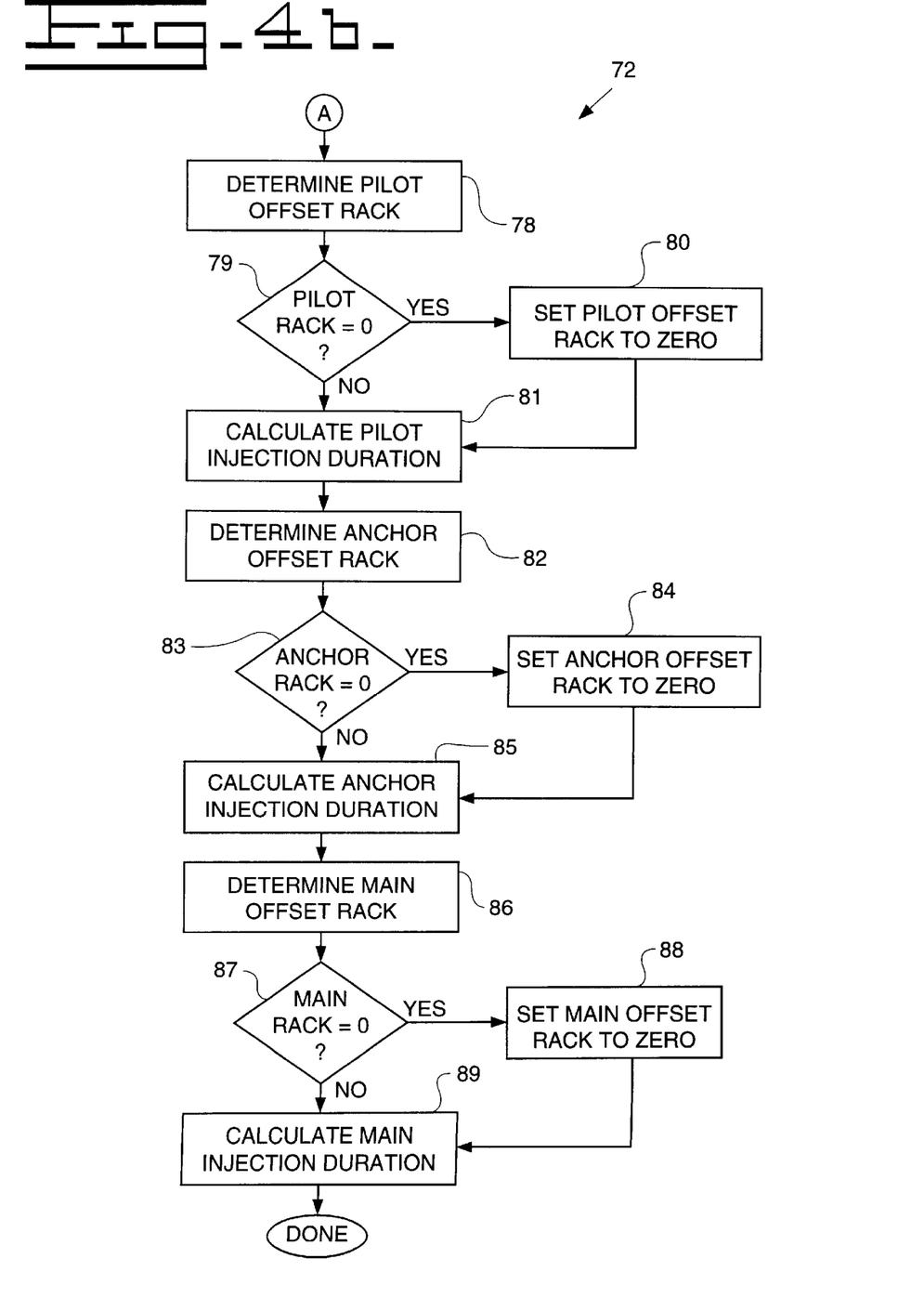
FIG. 4b is a second segment of a logic diagram showing the operation of the present invention.

FIGS. 4a and 4b illustrate a flow chart showing the logic steps performed by the ECM to determine the extended durations P', M' and A' of the injector actuation current.

FIG. 4a shows the first stage of a software flow chart 72 enabling the ECM 42 to calculate the desired durations for the corrected pilot, main, and anchor shots 44', 46' and 48'. As indicated in block 73, the ECM 42 determines the engine speed. The use of engine speed sensors is well known in the art. The ECM 42 then establishes the gain factor for the pilot, main, and anchor shots 44, 46 and 48, as shown in block 74. This can be done as previously explained by determining the shape of the appropriate wave trace pulse of the injector pressure curve 58 either dynamically, or via empirical analysis or by other known methods. As shown in block 75, the ECM 42 then refers to a lookup map to determine a cam correction factor for the pilot, main, and anchor shots 44, 46 and 48. This map can be a two dimensional map with timing in engine degrees as the independent axis. The pilot cam correction factor is determined using pilot shot timing; the main cam correction factor is determined using main shot timing; and the anchor shot cam correction factor is determined using anchor shot timing. The ECM 42 then modifies the pilot, main, and anchor gain factors established in block 74 by their respective cam correction factor as shown in block 76. This correction takes into account physical cam profile differences that are associated with the localized cam characteristics in relation to piston top dead center for a particular cylinder, and in the preferred embodiment would be substantially identical for all cylinders for a given engine angle. Next, as shown in block 77, the ECM 42 determines the respective pilot, main, and anchor rack and partitions the total rack amongst the pilot, main and anchor shots accordingly.

Stage two of the flow chart 72 is shown in FIG. 4b. As indicated in block 78, the ECM 42 establishes the pilot offset rack. For example, the pilot offset rack may be determined based upon the engine speed, using a look up table. Alternatively, the pilot offset rack may be dynamically calculated using the rack equation set forth above. Proceeding to block 79, the ECM 42 determines whether the pilot rack is set equal to zero, which would indicate that no pilot shot 44 is desired for this particular injection event. If the pilot rack is set equal to zero, the ECM 42 sets the pilot offset rack to zero, as shown in block 80, thereby assuring that the pilot injection duration calculated at block 81 is equal to zero.

Next, the ECM 42 calculates the corrected pilot injection duration 44' as shown in block 81 wherein the pilot rack from block 77 and the pilot offset rack from block 78 are combined in the rack equation as set forth in block 81. Therefore, the pilot injection delay may be accounted for based upon the pilot offset rack, which yields an additional injector current signal duration (P1).

Next, the ECM 42 determines the anchor offset rack as shown in block 82 similar to the determination of the pilot offset rack. Proceeding to block 83, the ECM 42 determines whether the anchor rack is set equal to zero. If so, the ECM 42 proceeds to block 84 and sets the anchor offset rack to zero, thereby assuring that the anchor injection duration calculated at block 85 is equal to zero. Next, the ECM 42 proceeds to calculate the corrected anchor injection duration 48' as shown in block 85. Here again, the anchor offset rack yields the additional injector current signal duration A' necessary to compensate for the anchor SOC/SOI delay 68.

Finally, in similar fashion, the ECM 42 determines the main offset rack, as shown in block 86. As shown in block 87, the ECM 42 then determines whether the main rack is set equal to zero. If so, the ECM 42 proceeds to block 88 and sets the main offset rack to zero to insure that the main injection duration 46' calculated at block 89 will be equal to zero. Next, the ECM 42 proceeds to calculate the corrected main injection duration 46' as shown in block 89. Here again, the main offset rack yields the additional injector current M' necessary to compensate for the main SOC/SOI delay 66. The ECM 42 then regulates the injector 12 to maintain the calculated duration for the respective corrected pilot, main, and anchor shots 44', 46' and 48'.

INDUSTRIAL APPLICABILITY

Utilization of an injection system in accordance with the present invention provides for better emission control during certain engine operating conditions as explained above. Although the particular injection waveform for delivering multiple fuel injections may vary depending upon the particular engine operating conditions, the present system is capable of determining the timing associated with each individual injection fuel shot, the injection duration, any delays between injection fuel shots, and the corrected pilot, main and anchor injection durations to compensate for the inherent SOC/SOI delay regardless of the type of mechanically actuated, electronically controlled fuel injectors being utilized, regardless of the type of engine being utilized, and regardless of the type of fuel being utilized. In this regard, appropriate fuel maps relating cam profile, engine speed, engine load, injection duration times, injection fuel quantities, anchor timing delay, and other parameters can be stored or otherwise programmed into the ECM 42 for use during all operating conditions of the engine. These operational maps, tables and/or mathematical equations stored in the programmable memory of the ECM 42 determine and control the various parameters associated with the appropriate multiple injection events to achieve desired emissions control.

As is evident from the forgoing description, certain aspects of the present invention are not limited by the particular details of the examples illustrated herein and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A fuel injection control system for regulating the injection duration of a fuel shot associated with a multi shot injection event of a fuel injector, the fuel injector having an inherent fuel injection pressure threshold and being in mechanical communication with a cam follower, the system comprising:

an electronic controller in electrical communication with the fuel injector, the controller being configured to deliver a calculated electronic control signal thereto; and a camshaft having a cam profile in mechanical communication with the cam follower, the cam profile being operable to generate pressure within the fuel injector sufficient to overcome the fuel injection pressure threshold in predetermined intervals in conjunction with the control signal of the electronic controller to cause the fuel injector to inject a predetermined volume of fuel during a fuel shot of the multi shot injection event.

2. The fuel injection control system as set forth in claim 1 wherein the cam profile includes at least one lobe operable to displace the cam follower a predetermined distance at a predetermined rate of acceleration for a predetermined duration to overcome the fuel injection pressure threshold in predetermined intervals in conjunction with the control signal.

3. The fuel injection control system as set forth in claim 1 wherein the electronic controller determines a rack for each fuel shot, the rack corresponding to a respective duration that the injector pressure overcomes the fuel injection pressure threshold.

4. The fuel injection control system as set forth in claim 3 wherein the electronic controller determines an offset rack for each fuel shot, the offset rack corresponding to a respective determined SOC/SOI time delay.

5. The fuel injection control system as set forth in claim 4 wherein the electronic controller determines a respective gain factor for each fuel shot.

6. The fuel injection control system as set forth in claim 5 wherein the electronic controller determines a respective cam correction factor for each fuel shot.

7. The fuel injection control system as set forth in claim 6 wherein the electronic controller modifies the respective gain factor for each fuel shot in accordance with the cam correction factor.

8. The fuel injection control system as set forth in claim 7 wherein the electronic controller determines the injection duration necessary to inject the predetermined volume of fuel during each fuel shot by multiplying the respective gain factor by the sum of the respective rack and respective offset rack and dividing by the engine speed.

9. A camshaft for use with a fuel injection control system having a fuel injector, the fuel injector having a cam follower and having an inherent fuel injection pressure threshold, the fuel injector being in electrical communication with an electronic controller for receiving a calculated control signal therefrom during each fuel shot associated with a particular fuel injection event, the camshaft comprising:

a cam profile in mechanical communication with the cam follower, the cam profile being operable to generate pressure within the fuel injector sufficient to overcome the fuel injection pressure threshold in predetermined intervals in conjunction with the calculated control signal of the electronic controller to cause the fuel injector to inject a predetermined volume of fuel during each fuel shot.

10. The camshaft as set forth in claim 9 wherein the cam profile includes at least one lobe operable to displace the cam follower a predetermined distance at a predetermined rate of acceleration for a predetermined duration to overcome the fuel injection pressure threshold in predetermined intervals in conjunction with the control signal of the electronic controller.

11. The fuel injection control system as set forth in claim 9 wherein the electronic controller determines an offset rack for each fuel shot, the offset rack corresponding to a respective determined SOC/SOI time delay.

12. The fuel injection control system as set forth in claim 11 wherein the electronic controller determines a rack for each fuel shot, the rack corresponding to the respective duration that the injector pressure overcomes the fuel injection pressure threshold.

13. The fuel injection control system as set forth in claim 12 wherein the electronic controller determines a respective gain factor for each fuel shot.

14. The fuel injection control system as set forth in claim 13 wherein the electronic controller determines a respective cam correction factor for each fuel shot.

15. The fuel injection control system as set forth in claim 14 wherein the electronic controller modifies the respective gain factor for each fuel shot in accordance with the cam correction factor.

16. The fuel injection control system as set forth in claim 15 wherein the electronic controller determines the injection duration necessary to inject the predetermined volume of fuel during each fuel shot by multiplying the respective gain factor by the sum of the respective rack and respective offset rack and dividing by the engine speed.

17. A method for causing a fuel injector to inject a predetermined volume of fuel during fuel shot associated with a particular fuel injection event, the fuel injector being in electrical communication with an electronic controller for receiving control signals of established timing and duration therefrom, the fuel injector further being in mechanical communication with a cam follower, the fuel injector having an inherent fuel injection pressure threshold, the method comprising the step of:

overcoming the fuel injection pressure threshold of the injector in predetermined intervals in conjunction with the established control signals.

18. The method as set forth in claim 17 wherein the step for overcoming the fuel injection pressure threshold includes the step of displacing the cam follower a predetermined distance at a predetermined acceleration rate for a predetermined duration to overcome the fuel injection pressure threshold in predetermined intervals in conjunction with the pre-calculated control signal.

19. The method as set forth in claim 18 wherein the step of displacing the cam follower includes the step of employing a camshaft having a cam profile in mechanical communication with the cam follower, the cam profile including at least one lobe of predetermined height and curvature operable to displace the cam follower a predetermined distance at a predetermined acceleration rate for a predetermined duration in conjunction with the precalculated control signal.

20. The method as set forth in claim 19 wherein the step of overcoming the fuel injection pressure threshold includes the steps of sensing the engine speed, electronically communicating the sensed engine speed to the electronic controller, and enabling the electronic controller to determine the initial injection current duration for each fuel shot, compute the gain factor for each fuel shot, compute an injection delay for each fuel shot, compute a corrected injection current duration to yield complete injection of the predetermined volume of fuel for each shot, and sustain the control signal for a duration equivalent to the corrected injection current duration for each shot of the fuel injection event.

21. The method as set forth in claim 20 wherein the step for enabling the electronic controller includes the step of determining a cam correction factor for each fuel shot, modifying the gain factor of each fuel shot in accordance with the respective cam correction factor, determining the rack for each fuel shot, determining the offset rack for each fuel shot, and multiplying the respective gain factor by the sum of the respective rack and the respective offset rack and dividing by the engine speed.

* * * * *

UNITED STATES PATENT AND TRADEMARK OFFICE
CERTIFICATE OF CORRECTION

PATENT NO.   : 6,516,783 B2
DATED        : February 11, 2003
INVENTOR(S)  : Charles H. Dutart et al.

It is certified that error appears in the above-identified patent and that said Letters Patent is hereby corrected as shown below:

<u>Title page,</u>
Item [56], References Cited, U.S. PATENT DOCUMENTS, Patent number "6,000,381" should be -- 6,000,384 --

Signed and Sealed this

Seventeenth Day of June, 2003

JAMES E. ROGAN
*Director of the United States Patent and Trademark Office*